United States Patent
Eyuboglu et al.

(10) Patent No.: US 7,170,871 B2
(45) Date of Patent: Jan. 30, 2007

(54) RADIO NETWORK CONTROL

(75) Inventors: Vedat Eyuboglu, Concord, MA (US);
Woojune Kim, Arlington, MA (US);
Sanjay Cherian, Brookline, MA (US)

(73) Assignee: Airvana, Inc., Chelmsford, MA (US)

( * ) Notice: Subject to any disclaimer, the term of this patent is extended or adjusted under 35 U.S.C. 154(b) by 0 days.

(21) Appl. No.: 10/848,597

(22) Filed: May 18, 2004

(65) Prior Publication Data
US 2004/0214574 A1 Oct. 28, 2004

Related U.S. Application Data

(63) Continuation-in-part of application No. 09/891,103, filed on Jun. 25, 2001.

(51) Int. Cl.
*H04Q 7/00* (2006.01)
(52) U.S. Cl. .............. 370/331; 370/392; 370/401; 455/436; 455/445
(58) Field of Classification Search ........ 370/331–352, 370/353–351, 392–401; 455/442, 436, 445
See application file for complete search history.

(56) References Cited

U.S. PATENT DOCUMENTS

| | | | |
|---|---|---|---|
| 5,790,528 A | 8/1998 | Muszynski | |
| 5,857,154 A * | 1/1999 | Laborde et al. | 455/444 |
| 6,091,953 A | 7/2000 | Ho et al. | |
| 6,252,862 B1 | 6/2001 | Sauer et al. | |
| 6,256,300 B1 | 7/2001 | Ahmed et al. | |
| 6,366,961 B1 | 4/2002 | Subbiah et al. | |
| 6,393,482 B1 | 5/2002 | Rai et al. | |
| 6,408,182 B1 | 6/2002 | Davidson et al. | |
| 6,418,306 B1 * | 7/2002 | McConnell | 455/413 |
| 6,445,922 B1 | 9/2002 | Hiller et al. | |
| 6,580,699 B1 * | 6/2003 | Manning et al. | 370/331 |

(Continued)

FOREIGN PATENT DOCUMENTS

| WO | WO 98/08353 | * | 2/1998 |
|---|---|---|---|
| WO | WO 98/09460 | | 3/1998 |

OTHER PUBLICATIONS

Paul Bender, et al., "CDMA/HDR: A Bandwidth-Efficient High-Speed Wireless Data Service for Nomadic Users", IEEE Communications Magazine, Jul. 2000.

(Continued)

*Primary Examiner*—John Pezzlo
*Assistant Examiner*—Inder Pal Mehra
(74) *Attorney, Agent, or Firm*—Fish & Richardson P.C.

(57) ABSTRACT

A first session is established for a first mobile access terminal on a first radio network controller via a first radio node. A first traffic channel is established between the first mobile access terminal and the first radio network controller. A first plurality of packets are sent and received over the first traffic channel. The first plurality of packets travel between a first radio node and the first radio network controller without passing through a second radio network controller. The first traffic channel is maintained as the first access terminal moves from a coverage area of the first radio node to a coverage area of a second radio node. A second plurality of packets travel between the second radio node and the first radio network controller without passing through another radio network controller.

26 Claims, 4 Drawing Sheets

U.S. PATENT DOCUMENTS

| | | | |
|---|---|---|---|
| 6,738,625 B1 | 5/2004 | Oom et al. | |
| 6,757,319 B1* | 6/2004 | Parsa et al. | 375/141 |
| 6,771,962 B2* | 8/2004 | Saifullah et al. | 455/436 |
| 6,834,050 B1 | 12/2004 | Madour et al. | |
| 2002/0067707 A1* | 6/2002 | Morales et al. | 370/331 |
| 2002/0145990 A1* | 10/2002 | Sayeedi | 370/335 |
| 2002/0193110 A1* | 12/2002 | Julka et al. | 455/432 |
| 2005/0025116 A1* | 2/2005 | Chen et al. | 370/349 |

OTHER PUBLICATIONS

Paul Bender & Ramin Rezalifar, "Draft Baseline Text for the 1xEV-DO Upper Layers (excluding Physical Layer)", 3GPP2, Aug. 17, 2000.

3GPP2, "3GPP2 Access Network Interfaces Interoperability Specification 2, Release A," Jun. 2000.

TIA/EIA/TSB-115, "Wireless IP Architecture Based on IETF Protocols", Jun. 6, 2000.

3GPP2, "Wireless IP Network Standard", 3rd Generation Partnership Project 2 (3GPP2), Version 1.0.0, Jul. 14, 2000.

Goran Janevski, "IP-Based Mobile Wireless Access Network Architecture", Nortel Networks-MWIF Contribution, Draft dated Sep. 7, 2000.

*International Search Report*, Patent Cooperation Treaty, Oct. 26, 2006, 6 pages.

*Written Opinion of the International Searching Authority*, Patent Cooperation Treaty, Oct. 26, 2006, 8 pages.

\* cited by examiner

RADIO NETWORK CONTROL

CROSS-REFERENCE TO RELATED APPLICATIONS

This application is a continuation-in-part application of and claims priority to U.S. application Ser. No. 09/891,103, filed on Jun. 25, 2001, hereby incorporated by reference.

BACKGROUND

This description relates to radio network control.

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for IP packet data services that can deliver a shared forward link transmission rate of up to 2.46 Mbit/s per sector using only (1x) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," $3^{rd}$ Generation Partnership Project 2 (3GPP2), Version 1.0, Jul. 14, 2000), HDR networks can be built entirely on IP technologies, all the way from the mobile Access Terminal (AT) to the global Internet, thus taking full advantage of the scalability, redundancy and low-cost of IP networks.

HDR has been adopted by TIA (Telecommunications Industry Association) as a new standard in the CDMA2000 family, an EVolution of the current 1xRTT standard for high-speed data-only (DO) services, formally referred to as HRPD (High Rate Packet Data), also known as 1xEV-DO or IS-856.

Figure 1:
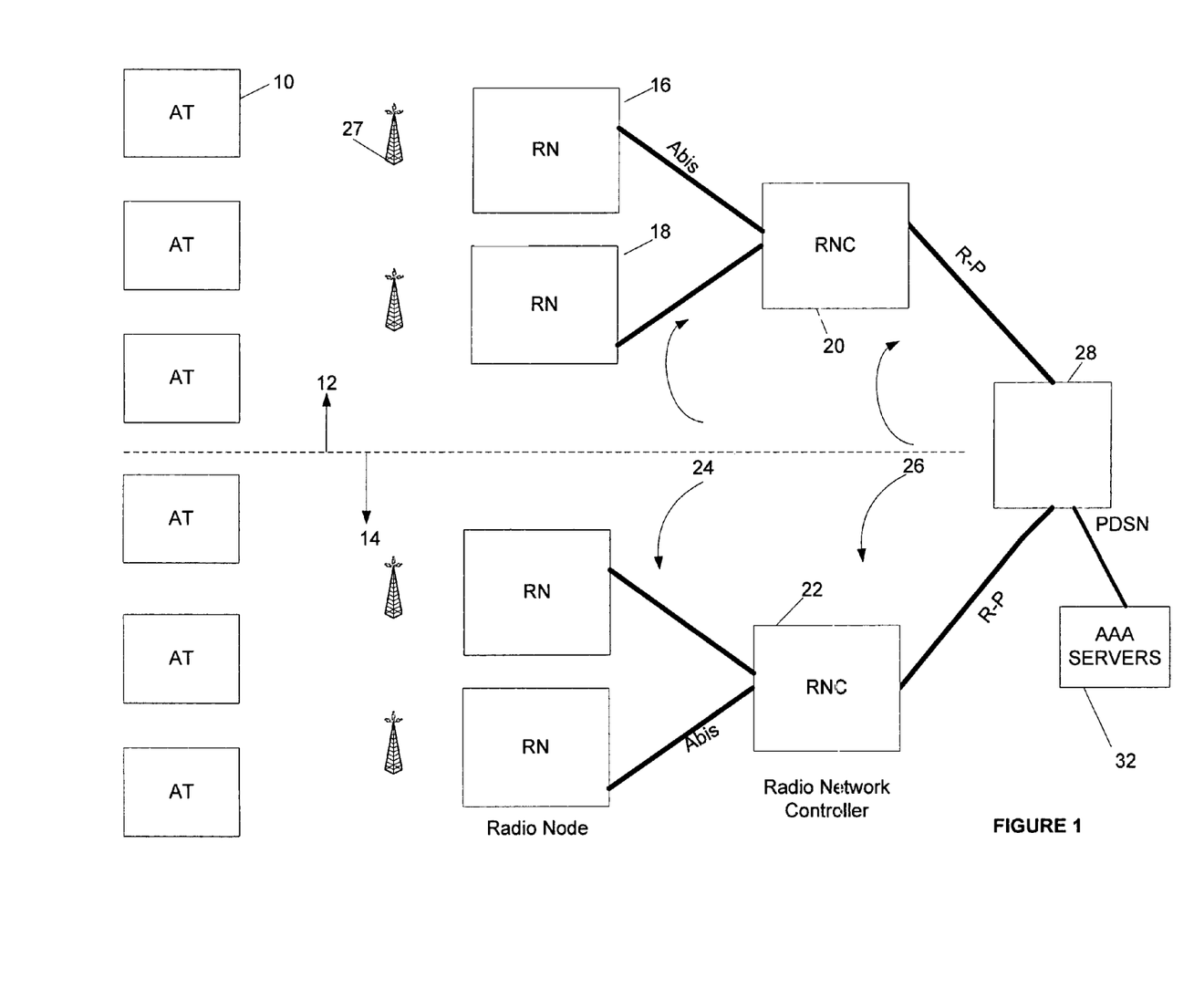
FIGS. 1 through 4 show networks.

IS-856 systems are typically implemented using the radio access network architecture shown in FIG. 1. Here the Access Terminal (AT) 10 may be a laptop computer, a Personal Digital Assistant (PDA), a dual-mode voice/data handset, or another device, with built-in IS-856 support.

The entire administrative service area of a wireless access provider may be divided into one or more subnetworks (or subnets) 12, 14. Each subnet 12 includes a set of Radio Nodes (RN's) 16, 18 and one or more Radio Network Controllers (RNC) 20, 22. The RN's are connected to RNC's over a backhaul network 24. In existing 2G and 3G wireless networks, each RN is connected to only one RNC using dedicated leased lines or ATM permanent virtual circuits (PVC's). Further, RNC's are connected to each other using dedicated leased lines or ATM PVC's. In a new generation of IP-based radio access networks, the backhaul can be implemented using a shared IP or metropolitan Ethernet network which supports many-to-many connectivity between RN's and RNC's.

Each RNC typically controls 25–100 RN's. Each RN typically supports 1–4 carriers each of 1.25 MHz of bandwidth. Further, each cell area (not shown) is typically divided into multiple sectors (typically 3 or 6) and the RN has one radio transceiver 27 for each sector.

Each RNC is connected over an IP network 26 to one or more Packet Data Serving Node's (PDSN's) 28 (see TIA references cited earlier). The RNC communicates with the PDSN over a standard interface termed the R-P (Radio-Packet) interface 30. The R-P interface is further broken into two interfaces: the A10 interface used to carry data and the A11 interface used to carry signaling. A PDSN can be viewed as an edge router that supports mobility; it maintains link layer connectivity to AT's through the Access Network. The PDSN also interfaces to AAA servers 32 for Authentication, Authorization, and Accounting (AAA).

Once an AT connects to the network, it establishes session with an RNC and receives a link layer address from the RNC. The session represents all the information the RNC needs to serve the AT. In IS-856 radio access networks as currently defined by 3GPP2 in 1xEV-DO IOS Phase 1 (IS-878), each RN is uniquely associated with an RNC and each subnet contains only one RNC. As a result, when an AT moves from the coverage area of one RNC to the coverage area of another, the AT performs a handoff, which includes a session transfer.

Every time a dormant AT crosses a subnet boundary, the AT initiates a dormant handoff by sending a UATI_Request. The AT recognizes the need for a dormant handoff by monitoring the 128-bit SectorID being broadcast by the sectors. All sectors that belong to the same subnet have SectorID's that fall within a certain range. The 128-bit Universal Access Terminal Identifier (UATI) assigned to an AT in a given subnet falls within the same range. When the AT moves into the coverage area of another subnet, the AT compares its UATI with the SectorID being broadcast by its serving sector. When these do not belong to the same range, the AT knows that it has crossed a subnet boundary and initiates the dormant handoff by sending a UATI_Request.

A first purpose of a dormant handoff is to inform the PDSN to send packets arriving for that AT to the new serving RNC. Dormant handoffs involve a relocation of the R-P (A10) session from the old serving RNC to the new serving RNC. Without such handoffs, the PDSN would send packets to an old serving RNC. Since the old serving RNC does not know the location of the AT outside its subnet, AT's packets may be lost.

A second purpose of a dormant handoff is to transfer session information between RNC's. In IS-856, each RNC maintains certain session information about the AT. Such session information is needed for communication over the air interface. Session information includes the Universal Access Terminal Identifier (UATI), security keys for access channel authentication and encryption, and other protocol constants. Every time the AT crosses an RNC boundary (in this case a subnet), a new UATI needs to be assigned to the AT and the remaining session information needs to be transferred from the old serving RNC to the new serving RNC. Such a transfer requires a network link between the RNC's. Without such session transfer, every handoff between RNC's would result in a new and lengthy session establishment, taking up precious air resources and causing delays. When the footprint of an RNC is small, dormant handoffs occur frequently, resulting in excessive use of airlink resources (for the new UATI assignment), extra processing for the RNC's to implement the session transfer, and extra processing for the RNC and PDSN to relocate the A10 connection.

In CDMA2000 systems, mobility management is provided by the Mobile Switching Center (MSC)/Visitor Location Register (VLR). When an AT provides a location update to inform the network of its new location, this information is immediately forwarded to the serving MSC. Such location updates are provided by the AT when the it moves sufficiently away from the sector where it last provided a location update. When the PDSN receives a packet data for an AT, it sends the packet to the PCF. The PCF, recognizing that no traffic channel exists for this AT, in turn informs the RNC that last served this AT. That RNC then informs the MSC. The MSC, equipped with location information stored in the VLR, requests one or more RNC's to page the AT from a certain set of sectors. Once the AT responds with an Origination message to its serving RNC, the serving RNC sets up a so-called A8/A9 connection to the PCF. Soon after, the PCF starts forwarding the received packets to the serving RNC.

Figure 2:
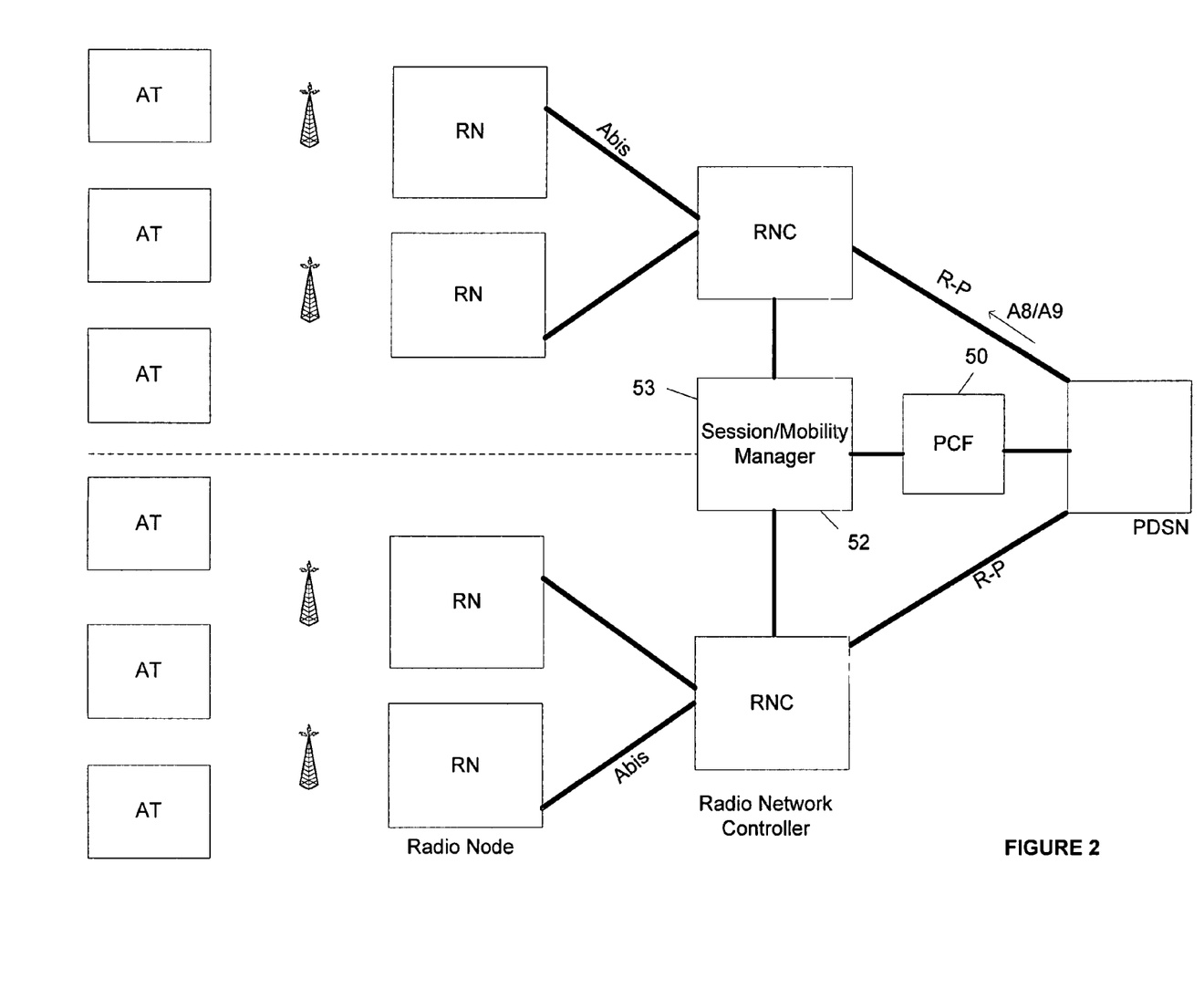

A similar procedure can be used in IS-856, by adding a similar PCF entity 50, as shown in FIG. 2. (A system like the one described here has been proposed in 3GPP2 for 1xEV-DO IOS Phase 2.) However, since IS-856 networks do not have an MSC, it is necessary to define a separate mobility management function (Mobility Manager 52) responsible for maintaining the location information for every AT that is being served by the RNC's under its control. Such a Mobility Manager can be integrated into the PCF, or can be a separate network entity. Any time the AT provides a location update by sending an IS-856 RouteUpdate message, its location information is immediately forwarded by the serving RNC to the Mobility Manager. When the PDSN receives a packet data for an AT, it sends the packet to the PCF, which in turn informs the Mobility Manager. The Mobility Manager, equipped with the location information requests, either directly or via the RNC that last received a location update from the AT, requests one or more RNC's to page the AT from a select set of sectors. Once the AT responds with a ConnectionRequest message, the serving RNC sets up a so-called A8/A9 connection to the PCF. Soon after, the PCF starts forwarding received packets to the serving RNC. This approach eliminates the need for relocating the A10 (R-P) session to the PDSN every time the AT crosses an RNC boundary, effectively expanding the size of the subnet to cover multiple RNC's.

The Mobility Manager function does not address the session transfer issue described earlier. For this purpose, another logical network element, a Session Manager 53 is introduced. Like the Mobility Manager, a Session Manager controls multiple RNC's, and maintains session information for all sessions handled by the RNC's that it controls. Like the Mobility Manager, the Session Manager may be a separate network element, may be combined with the Mobility Manager or may be integrated with the PCF.

When a new session is to be established, the serving RNC interacts with the Session Manager. The Session Manager provides the UATI to be assigned to the AT and stores the session parameters that the serving RNC has determined during the key exchange and configuration phases of the session set-up. Whenever the AT establishes a new connection with its serving RNC, the RNC retrieves the session information from the Session Manager. In the case where the Session Manager is integrated with the PCF, this can be accomplished during the A8/A9 connection set-up procedures. The RNC provides the latest session information back to the Session Manager when a connection is closed. Again, in the case where the Session Manager is integrated with the PCF, this can be accomplished during the A8/A9 connection tear-down procedures. Additional delays are caused by passing of session information back and forth between the Session Manager and the RNC during every connection set-up.

SUMMARY

In one aspect, there is a method. The method includes, in connection with a mobile wireless network including a first and a second radio network controller and a first and a second radio node, establishing a first session for a first mobile access terminal on the first radio network controller via the first radio node. The method also includes establishing a second session for a second mobile access terminal on the second radio network controller via the second radio node and establishing a first traffic channel between the first mobile access terminal and the first radio network controller. The method also includes sending and receiving a first plurality of packets over the first traffic channel, where the first plurality of packets traveling between a first radio node and the first radio network controller without passing through the second radio network controller. The method also includes maintaining the first traffic channel as the first access terminal moves from a coverage area of the first radio node to a coverage area of the second radio node, where a second plurality of packets travel between the second radio node and the first radio network controller without passing through another radio network controller. The method also includes establishing a new session for the first mobile access terminal on the second radio network controller or performing an inter-RNC dormant handoff from the first radio network controller to the second radio network controller when the first access terminal is in a dormant state after moving from a coverage area of the first radio node to a coverage area of the second radio node.

In another aspect, there is a method. The method includes, in connection with a mobile wireless network including a first and a second radio network controller and a first and a second radio node, the radio network controllers each implemented on a chassis-based hardware platform with multiple server cards, establishing a first session for a first mobile access terminal on the first radio network controller via the first radio node. The method also includes establishing a first traffic channel between a first mobile access terminal and the first radio network controller and sending and receiving a first plurality of packets over the first traffic channel, where the first plurality of packets travel between a first radio node and the first radio network controller without passing through any other radio network controller. The method also includes establishing a second traffic channel between a second mobile access terminal and the second radio network controller and sending and receiving a second plurality of packets over the second traffic channel, where the second plurality of packets travel between the second radio node and the second radio network controller without passing through any other radio network controller. The method also includes maintaining the first traffic channel as the first access terminal moves from a coverage area of the first radio node to a coverage area of the second radio node, a third plurality of packets traveling between the second radio node and the first radio network controller without passing through another radio network controller, and maintaining the first session when the first mobile access terminal moves to the coverage area of the second radio node.

In another aspect, there is a computer program product, tangibly embodied in an information carrier, and adapted to work in a mobile wireless network including a first and a second radio network controller and a first and a second radio node. The computer program product includes instructions operable to cause data processing apparatus to establish a first session for a first mobile access terminal on the first radio network controller via the first radio node and establish a second session for a second mobile access terminal on the second radio network controller via the second radio node. The computer program product also includes instructions that are further operable to cause the data processing apparatus to establish a first traffic channel between the first mobile access terminal and the first radio network controller and send and receive a first plurality of packets over the first traffic channel, where the first plurality of packets travel between a first radio node and the first radio network controller without passing through the second radio network controller. The computer program product also includes instructions that are further operable to cause the data processing apparatus to maintain the first traffic channel as the first access terminal moves from a coverage area of the first radio node to a coverage area of the second radio node, where a second plurality of packets travel between the second radio node and the first radio network controller without passing through another radio network controller.

In another aspect, there is a mobile wireless network. The mobile wireless network includes a first radio network controller, a second radio network controller, a first radio node, a second radio node, a first mobile access terminal, and a second mobile access terminal. The first mobile access terminal is associated with a first session established on the first radio network controller via the first radio node and a first traffic channel established with the first radio network controller. The first mobile access terminal sends and receives a first plurality of packets over the first traffic channel, wherein the first plurality of packets travel between a first radio node and the first radio network controller without passing through the second radio network controller. The second mobile access terminal is associated with a second session established on the second radio network controller via the second radio node. The first traffic channel is maintained as the first access terminal moves from a coverage area of the first radio node to a coverage area of the second radio node. A second plurality of packets travel between the second radio node and the first radio network controller without passing through another radio network controller.

Other examples of any of the aspects above can include one or more of the following features. A primary association can be established between the second radio node and the second radio network controller. A secondary association can be established between the second radio node and the first radio network controller. Establishing the primary association can include passing PN offset and IP address information from the second radio node to the second radio network controller. Establishing the secondary association can include passing PN offset and IP address information from the second radio node to the first radio network controller. The first radio node can broadcast a first subnet identifier. The second radio node can broadcast a second subnet identifier different from the first subnet identifier. Each radio node can be individually configured with its respective subnet identifier. The radio nodes can each obtain its subnet identifier from its respective radio network controller with whom it has established a primary association.

The first access terminal can monitor the subnet identifier while in the dormant state and trigger the new session establishment or the dormant inter-RNC handoff from the first radio network controller to the second radio network controller upon detecting a change in the subnet identifier. The first access terminal can trigger the new session establishment or the dormant inter-RNC handoff from the first radio network controller to the second radio network controller by sending a UATI Request message.

A primary association can be established between a third radio node and the first radio network controller. A secondary association can be established between the third radio node and the second radio network controller. The third radio node can broadcast a third subnet identifier different from first and second subnet identifiers associated with the first and second radio nodes. The first radio network controller can assign a new UATI to the first access terminal when it is in the dormant state after moving from a coverage area of the first radio node to a coverage area of the third radio node. An RNC resource control agent can be employed for storing the session information for sessions being served by one or more radio network controllers. The RNC resource control agent can detect a failure of a radio network controller and, upon detection of the failure of a radio network controller, reassign user sessions to remaining radio network controllers and pass session information to these remaining radio network controllers. Partial session information can be passed that provides a new radio network controller enough information about the first access terminal to send a message to close the session.

A chassis-based hardware platform with multiple server cards can be employed to implement each of the radio network controllers. An association can be established between the second radio node and the first radio network controller by homing on one of the server cards on the first radio network controller. An association can be established between the second radio node and the second radio network controller by homing on one of the server cards on the second radio network controller. A transport-layer connection, such as TCP or SCTP, can be established for signaling between each radio node and the server cards to which it is homed in the radio network controllers. Establishing the association can include passing PN offset information from the second radio node to the server card to which it is homed. The PN offset information can be distributed from the server cards receiving the PN offset information to other server cards in the chassis-based hardware platform. The inter-RNC handoff procedure can comply with an A13 interface of a 1xEV-DO IOS specification.

Access channel packets can be routed in the first and second radio nodes based on a session identifier associated with the first and second access terminals. The session identifier associated with the first access terminal can be based on an access terminal identifier (ATI) based on a 1xEV-DO standard. The session identifier associated with the second access terminal can be based on a temporary mobile subscriber identity (TMSI) based on a cdma2000 standard. The radio network controllers can include a PDSN function. A new session can be established for the first mobile access terminal on the second radio network controller or an inter-RNC dormant handoff from the first radio network controller to the second radio network controller can be performed when the first access terminal is in dormant state after moving from a coverage area of the first radio node to a coverage area of the second radio node. The first radio network controller and the first radio node can be co-located. The second radio network controller and the second radio node can be co-located.

Implementations can realize one or more of the following advantages. By establishing primary or secondary associations between all radio nodes and all radio node controllers, a radio node controller has the information necessary to find and communicate with any radio node on the IP backhaul as an access terminal moves from the coverage area of one radio node to the coverage area of another radio node. This allows the radio network to perform normal soft handoff even when the access terminal moves into the coverage area of a radio node, whose primary RNC is different from the one currently serving the access terminal. This avoids more traditional inter-RNC handoff procedures, which are known to be error-prone and introduce additional latencies. One implementation of the invention provides all of the above advantages.

DESCRIPTION

Existing 3G wireless network architectures, including the ones discussed above for IS-856, assume a fixed relationship between RN's and RNC's. In other words, all traffic flowing from or to an RN goes through the same RNC. This requires complex hierarchical structures to handle dormant handoffs between RNC's and requires frequent and delay-prone inter-RNC (soft) handoffs. Fixed associations between RN's and RNC's are needed in circuit-switched voice applications when point-to-point dedicated leased lines are used for backhaul connectivity between RN's and RNC's as illustrated in FIGS. 1 and 2.

In the examples that follow, an RNC represents a radio network controller directly attached to an IP network. Direct attachment means the RNC can send/receive IP packets to/from other nodes in the IP network without any intermediate processing above the IP layer. An RNC may be implemented on a chassis-based hardware platform, which may consist of multiple server cards. In this case, the entire chassis may be viewed as an RNC directly connected to the IP network, and the individual server cards need an intermediate node (or an I/O server card) operating above the IP layer to send/receive IP packets to/from other nodes in the IP network. In an alternative implementation, individual server cards in a chassis-based hardware platform may be directly attached to the IP network. In this case the server cards may have individual IP addresses and they may each then be viewed as an RNC. An RNC may also be implemented on standalone server hardware, such as a conventional compute server or a blade server. In this case, the server may be viewed as the RNC and has an IP address visible to other RN's and RNC's in the radio access network.

IP-Based Radio Access Network Architecture with Inter-RNC Signaling

Figure 3:
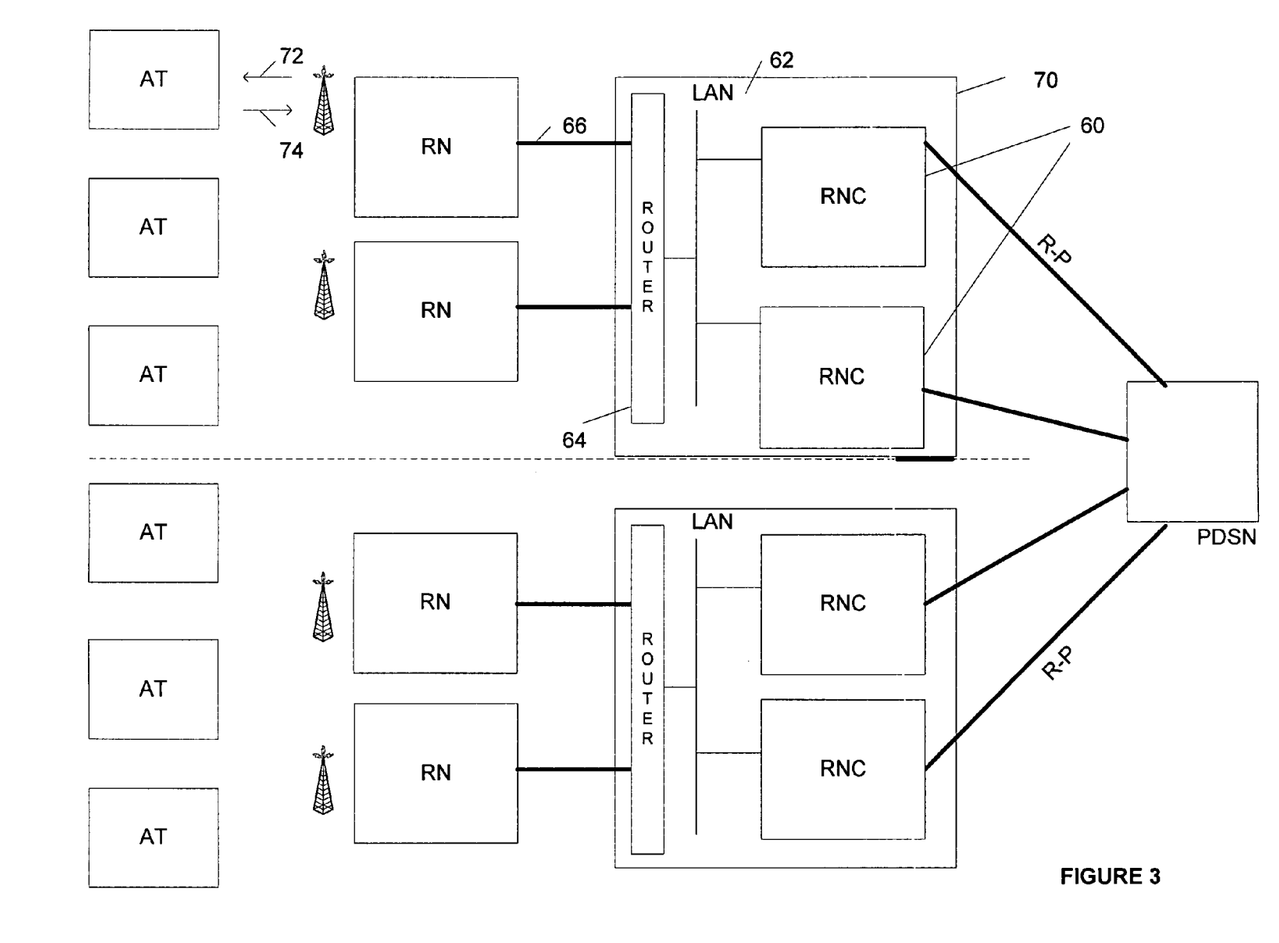

First, as shown in FIG. 3, consider the case where a set of RNC's 60 are co-located in a data center and are connected together via a high-speed Local Area Network (LAN) 62 such as a Gigabit Ethernet LAN. In this case, RNC's connect to the network via LAN interfaces and a router 64 provides the connectivity to the external network. Such a configuration can be referred to as an RNC cluster (or pool). (The description below describes how the same concept can be extended to RNC's connected over a more general IP network, such as a metropolitan-area network.) In the past, when the main traffic type carried through a wireless network was circuit-switched voice, such clustering using an Ethernet LAN was not feasible. RN's may connect to the router in the data center using dedicated leased lines 66. It is assumed that RN's and RNC's are all IP addressable. In other words, any RN served by the cluster can communicate directly at the IP level with any of the other RNC's in the cluster.

In an RNC cluster such as the one described above, it is important to avoid any handoff boundaries between individual RNC's so that the entire cluster can behave as if that cluster was one big RNC. This would eliminate unnecessary handoffs due to mobility, thereby greatly improving scalability and reliability.

To accomplish this, suppose in one example, an IS-856 subnet 70 is defined to be the entire footprint of the RNC cluster, not the footprint of just one RNC. In other words, all the RN's served by the cluster now belong to the same subnet. To simplify the system operation, each RN in the subnet is associated (e.g., primary association) with one RNC in the cluster. This association is established when an RN is first powered. The detailed meaning of this association will be explained later.

Access Channel Packet Routing

Each sector in an RN can transmit to an AT over the forward traffic or control channels 72. Similarly, each sector in an RN can receive from an AT over the reverse traffic or access channels 74. The access channel and the reverse traffic channels are separated by code division multiplexing using a Long Code Mask, whereas the control channel and the forward traffic channels are separated by time-division multiplexing using a preamble. The preamble identifies a forward link physical layer packet as a control channel packet or as a traffic channel packet associated with a certain MAC Index. A MAC Index, an integer between 0 and 63, is unique within a sector and is assigned by the RN and RNC at the time of traffic channel establishment. Similarly, the Long Code Mask identifies a reverse link physical layer packet as an access channel packet or a specific traffic channel packet. The Long Code Mask is based on the AT's UATI for the traffic channel, and is based on the SectorID of the serving sector for the access channel. The sending AT of an access channel packet and the recipient AT of a control channel packet are indicated in the ATI field of a MAC Layer header.

Whenever an RN receives a MAC Layer packet on one of its access channels, the RN forwards the packet, without even looking at its content, to its primary (or Default) RNC in the cluster with whom that RN is associated. As such, when a packet carrying a UATI_Request message is received from an AT, the packet is forwarded by the receiving RN to the Primary RNC. The RN encapsulates the MAC Layer packet in an IP packet (possibly multiplexed with MAC Layer packets of other AT's) with a destination IP address equal to an IP address of the serving RNC. The IP packet is carried over the backhaul network to an aggregation router at the data center and the router forwards the packet to the serving RNC over the Ethernet LAN.

All access channel packets include an address field that identifies the sending AT. When the sending AT has already been assigned a UATI by an RNC, the address field contains that UATI. When the sending AT does not yet have a UATI, the address field contains a Random Access Terminal Identifier (RATI), which is randomly selected by the AT. The first two bits of the address field indicate whether the address is a UATI or a RATI.

When the (Ethernet) I/O subsystem of an RNC receives a UATI_Request message from an AT with an address field that contains a RATI or an unrecognized UATI, the RNC assumes the role of the serving RNC to handle the session. If the RNC is implemented on a chassis-based hardware platform, it assigns the session to one of its server cards. The AT is then assigned a UATI within some predetermined range. This range, which identifies the serving RNC to all other RNC's in the cluster, is known by all the RNC's in the cluster, but is not known by the AT. If the RNC is implemented on a chassis-based hardware platform, the range of the UATI's that belong to a certain RNC may further be subdivided to identify the server card within the serving RNC that is handling the session. The serving RNC also establishes an A10 connection with the PDSN in order to facilitate the data transfer between the AT and the PDSN. The A10 connection terminates on the server card handling the session.

While dormant, the AT sends RouteUpdate messages, as needed, to provide information about its current location. This mobility information is maintained at a Mobility Manager in the serving RNC. Since a subnet covers the entire footprint of the RNC cluster, when the AT crosses the boundary between two RNC's in the same cluster, the AT does not detect a subnet change and therefore does not initiate a dormant handoff. But when the AT sends an access channel message to an RN that is associated with a different RNC (broker RNC) in the cluster, the packet(s) carrying that message are sent by the RN to the broker RNC. The I/O subsystem in the broker RNC examines the address field of all arriving access channel packets and reads the UATI. From the UATI, the I/O subsystem determines by table look-up the identity of the serving RNC and forwards the access channel packet to that RNC over the high-speed LAN. When the UATI on the access channel packet is served by the receiving RNC, it processes the packet locally. If the receiving RNC is implemented on a chassis-based hardware platform, its I/O subsystem first determines the server module (card) that is handling the UATI (session) and forwards the packet to that card using an internal bus of the serving RNC.

Page Routing

If packet data is received from the PDSN for a dormant AT, the packets are forwarded over the A10 interface to a specific server card on the serving RNC. That server card then looks up the location information for that AT. The serving RNC then sends a paging message via a set of RN's that are determined based on the last Route Update message received from the AT. The paging message is sent via the control channel of one or more sectors that belong to the RNC cluster. The RN's transmitting the paging message may not be associated with the serving RNC (i.e., they may have a different Primary RNC), but they need to be associated with one of the RNC's in the cluster.

Connection (Traffic Channel) Establishment

When a serving RNC receives a ConnectionRequest message from the AT, either directly or via a broker RNC, it examines the pilot strengths reported by the AT in the RouteUpdate message accompanying the ConnectionRequest message. To simplify system operation, it is assumed that each RN's radio resources are managed by a Radio Resource Control function in the RNC with whom the RN is associated. Furthermore, an RN can exchange signaling only with the RNC with whom it is associated. Therefore, when the serving RNC wants to establish a traffic channel that involves RN's that are associated with other RNC's, the serving RNC first communicates directly with the Radio Resource Control function on those RNC's to check for resource availability. Such communication occurs over the high-speed LAN. When sufficient radio resources are available, the serving RNC establishes the necessary traffic channel communication links with the RN's via the RNC's with whom these RN's are associated and sends a TrafficChannelAssignment message to the AT to initiate the traffic channel set up. Once a traffic channel has been established, packets flow directly between the RN's and the serving RNC without any involvement of any broker RNC. Such direct routing eliminates the delays typically found in soft handoff procedures that involve triangular routing through another RNC.

When a new traffic channel involves an RN that is outside the footprint of the RNC cluster (different subnet), a similar procedure is implemented. In this case, the serving RNC communicates with the RNC's outside the cluster over an IP network (a metropolitan-area network) to obtain radio resources. If the radio resources are available, the serving RNC establishes a communication link with that RN by exchanging signaling via the RNC's with whom these RN's are associated.

This method allows the serving RNC to maintain the traffic channel, even when the AT moves into the coverage area of an RN that is associated with an RNC different from the serving RNC.

Improved IP-based Radio Network Architecture Without Inter-RNC Signaling

The scheme described so far can be improved in couple of areas. First, the triangular routing of access channel packets via a broker RNC can be eliminated by moving that routing function to the RN's. This will reduce delays in handling access channel packets, for example during traffic channel set-up, at the expense of some increase in processing power at the RN. Furthermore, one can eliminate all signaling between RNC's and instead allow RNC's directly exchange signaling with all RN's in the radio access network. This helps create a simpler network architecture, which is easier to deploy and maintain.

The Radio Resource Control function can also be moved from the RNC's to the RN's, thereby further reducing delays in traffic channel set-up procedures.

The IP-based radio access network and its enhanced version described here both allow exploitation of the flexibilities of IP and metropolitan Ethernet networks and result in a more distributed system where an AT may remain attached to its serving RNC regardless of its position, except when the distance between the AT and the serving RNC becomes excessive. To provide these capabilities each RN may associate with multiple RNC's, possibly with all the RNC's in the IP-based radio access network, but here it is not necessary to have one of the RNC's behave as a primary RNC.

Avoiding Triangular Routing of Access Channel Packets

When powered on for the first time, an AT registers with the IS-856 network as follows: The AT acquires an IS-856 pilot being broadcast by one of the nearby sectors and synchronizes with the system. To initiate the session establishment, the AT sends a UATI_Request. As before, the AT uses a Random ATI (RATI) in the MAC Layer header to send this request.

The RN examines the address field of the access channel packet and recognizes that the originator of the message does not have an assigned UATI and forwards the packet to its Primary RNC with whom the RN is associated. To examine the address field, the RN first extracts the MAC Layer capsule fragments from the received MAC Layer packets, and forms the MAC Layer capsule. The RN then reads the address field in the MAC Layer header.

After receiving the UATI_Request, the Primary RNC assumes the role of the serving RNC and assigns a UATI to the AT. The primary RNC then proceeds with the rest of session establishment, in particular the security key exchange and the protocol configurations. (An improved version of this procedure to increase availability and to provide better load balancing is described in more detail below.) The RNC also implements the PPP/CHAP procedure to authenticate the AT based on its Network Access Identifier (NAI). There is a one-to-one mapping between the NAI and the terminal's actual IMSI (International Mobile Subscriber Identity). This mapping is maintained in an AAA (Radius) server (not shown). The AAA server passes the AT's IMSI value to the serving RNC.

The PCF function in the serving RNC uses this IMSI value to select a PDSN as described in the IS-2001 standard and establishes an A10 connection to that PDSN. In the A11 Registration message, the PCF function provides the IMSI value of the AT along with its own SID/NID/PZID identifier to the PDSN. The AT and the PDSN then set up a PPP link, perform Simple IP or Mobile IP set-up and execute user-level authentication.

Each RN keeps a routing table for the mapping between the UATI and the serving RNC. This routing table may be provided to the RN by a network management system. As in the previous system, each RNC owns the UATI values that fall within a certain range. Whenever the RN receives an Access Channel packet, the RN determines from the UATI value in the MAC Layer Header the identity of the serving RNC, and routes the packet to that RNC by placing an IP address of the serving RNC in the destination address field of the IP header. This approach allows access channel packets to be delivered from any RN directly to the serving RNC.

Avoiding Handoffs Between RNC's

As before, mobility management for a given AT is handled entirely by the serving RNC. The AT is configured to provide distance-based location update in dormant mode. In other words, whenever the serving sector is more than a certain distance away from the sector where it last sent a RouteUpdate message, the AT sends a new RouteUpdate message to the serving sector over the Access Channel. The RouteUpdate message is forwarded by the RN to the serving RNC which then keeps track of the location of the AT.

When the serving RNC wants to page an AT, the serving RNC first determines the RN or RN's from which it wants to send the page, depending on the time and position indicated in the most recent RouteUpdate message received from the AT. It is assumed here that the serving RNC knows the IP addresses of all the RN's in the radio access network. The RNC can obtain this information from a network management system or directly from the RN's when they associate with the RNC during initial power-up. The serving RNC sends the paging message to the appropriate set of RN's directly. These RN's then page the AT over their respective control channels.

All sectors in an IS-856 network broadcast in their overhead channel their SectorID and Subnet Mask. For a relatively small network, one can set the Subnet Mask to zero, thereby implying that the entire network is one big subnet. In this scenario, the AT never detects a subnet change. Therefore, the AT remains attached to the original serving RNC and does not trigger a dormant inter-RNC handoff. The A10 connection to the PDSN also remains fixed regardless of the position of the AT.

If the radio access network covers a geographically large area, it may be prudent to force a dormant inter-RNC handoff, when the AT moves too far away from the serving RNC. This can be triggered by the serving RNC, for example, upon receiving a RouteUpdate message from the AT. Alternatively, the Subnet Mask can be chosen greater than zero to introduce a subnet boundary between too far-away RNC's. Then, when the AT crosses the subnet boundary, a dormant handoff occurs and the A10 connection is relocated. Further, the AT is assigned a new UATI and session parameters are transferred from the old serving RNC to the new serving RNC.

Faster Traffic Channel Setup Using Distributed Radio Resource Control

What follows next is a description of how moving the Radio Resource Control from the RNC's to the RN's and establishing a direct signaling link between all the RNC's and the RN's in the radio access network reduces the set-up time for traffic channels that (in the previous scheme) involved multiple RNC's. Whenever the AT sends a ConnectionRequest message over the access channel along with a RouteUpdate message to initiate a new traffic channel, the message is immediately forwarded from the receiving RN to the serving RNC. The serving RNC examines the RouteUpdate message to determine a likely set of sectors that may be included in the Active Set. The serving RNC then corresponds directly with the RN's where these sectors reside, to request traffic channel and backhaul resources. The RN's either decline, or accept and allocate the needed radio resources. If resources are available from a sufficient set of RN's, the serving RNC accepts the traffic channel request, and sends a TrafficChannel assignment message over the Control Channel to the AT. The AT then starts transmitting on the Reverse Traffic Channel (RTC). Once the RN acquires the RTC, an RTCAck message is sent to the AT to indicate the acquisition of the RTC signal. The AT then responds with a TrafficChannelComplete message to indicate the completion of the Traffic channel set-up.

In this procedure each RN controls its own radio resources, both with respect to hardware resources available on the RN, as well as the management of interference across its sectors. As a result, the admission control function is split between the RN and the serving RNC. RN's provide local admission control for the sectors they control while the serving RNC provides a global admission control. Similarly, when a sector in a given traffic channel is inactive for some period of time, the sector can initiate the procedure for closing the traffic channel by sending a request to the serving RNC to close the traffic channel. The serving RNC then makes a global decision on whether to remove that sector from the traffic channel, close the entire traffic channel or do nothing.

Once a traffic channel has been setup between the AT and a serving RNC, it remains anchored to the serving RNC, even when the AT moves into the coverage area of other RN's in the IP-based radio access network.

Packet Routing Between RN and RNC—In More Detail

When a sector in the RN receives a MAC Layer packet on a reverse traffic channel, the sector forwards the packet to an I/O card after adding a Stream Identifier that includes a Connection Identifier. The I/O card uses the Connection Identifier value to look up the IP address of the serving RNC. The I/O card then encapsulates the MAC Layer packet together with its Stream Identifier in an IP packet whose destination address is set to the IP Address of the serving RNC. If the serving RNC is implemented on a chassis-based hardware platform, the I/O module in the serving RNC, upon receiving the packet, reads the UATI value to determine the server module that handles this session. The I/O card then passes the packet along with the Stream Identifier to that server module for further processing.

When a sector in the RN receives a MAC Layer packet on the access channel, the sector first reads the UATI in the ATI field of the MAC Layer Header and then forwards the packet to an I/O card after adding a Stream Identifier that includes the UATI of the sending AT along with the serving sector's SectorID. The I/O card in the RN again uses the UATI value to look up the IP address of the serving RNC. The I/O card encapsulates the MAC Layer packet together with its Stream Identifier in an IP packet whose destination address is set to the IP Address of the serving RNC. If the RNC is implemented on a chassis-based hardware platform, the I/O module in the serving RNC, upon receiving the packet, reads the UATI value to determine the server module that serves this session. The I/O card then passes the MAC Layer packet along with the Stream Identifier to that server module for further processing.

When the serving RNC has a MAC Layer packet ready for transmission on a forward traffic channel, it first looks up the IP address of the RN to which to send the packet. It then encapsulates the MAC Layer packet together with a Stream Identifier in an IP packet whose destination address is set to the IP Address of the RN. The RN, upon receiving the packet, reads the SectorID value in the Stream Identifier to determine the sector that will transmit the packet. The RN then passes the MAC Layer packet along with the Stream Identifier to the appropriate modem card, which schedules the MAC Layer packet for transmission on the Forward Link using the MAC Index as the preamble.

Similarly, on the forward link, when a serving RNC has a MAC Layer packet ready for transmission on the Control Channel of a particular sector, the serving RNC determines the IP address of the RN to which to send the packet. It then encapsulates the MAC Layer packet together with its Stream Identifier in an IP packet whose destination address is set to the IP Address of the RN. The RN, upon receiving the packet, reads the SectorID value in the Stream Identifier to determine the sector that will transmit the packet. The RN then passes the MAC Layer packet along with the SectorID and MAC Index to the appropriate modem card. The modem card schedules the packet for transmission on the control channel.

Failure Recovery & Load Balancing

The improved IP-based radio access network architecture described earlier can be further extended to increase the overall reliability of the wireless network.

Failure Recovery Without Session Preservation

First, consider an approach where each RN, upon power-up, first communicates with a primary RNC Resource Control Agent who may reside in one or more of the RNC's or may reside on a separate compute engine or server. The primary Resource Control Agent assigns each RN to a Primary RNC. The RN then routes all new session requests to that Primary RNC.

When an RNC becomes completely unreachable due to some failure, all AT's that are being served by that RNC will ultimately recognize that their IS-856 sessions have been lost. Each of these AT's will initiate a new session by sending a UATI_Request over the Access Channel. Every RN who receives one of these requests will route them to its primary RNC. If at any time, the RN cannot reach its primary RNC, the RN will immediately request a new primary RNC from the primary RNC Resource Control Agent. If the primary RNC Resource Control Agent is also not reachable, the RN will send a similar request to a secondary RNC Resource Control Agent. Once the UATI_Request is received by the Primary RNC, the Primary RNC will immediately establish a new IS-856 session with the AT and will further initiate the procedure to set up a new A10 connection with a PDSN.

Assignment of a new Primary RNC may also be initiated by the RNC Resource Control Agent. This can be accomplished by having the RNC Resource Control Agent continuously monitor the health of all the RNC's in the subnetwork. Upon detecting the failure of an RNC, the RNC Resource Control Agent immediately communicates with all affected RN's and assigns them to new Primary RNC's. In assigning RN's to Primary RNC's, the RNC Resource Control Agent may perform load balancing to ensure that user sessions are evenly distributed across all available RNC's.

Load Balancing Session Assignment

The above method can be further enhanced by making the RNC Resource Control Agent ultimately responsible for assigning user sessions to RNC's. In this case, when a primary (or Default) RNC or possibly the RN itself receives a new UATI_Request, the Primary RNC (or the RN) asks the RNC Resource Control Agent to assign the session to an RNC. The RNC Resource Control Agent assigns the session to an RNC based on resource availability, loading and the distance between the RNC and the RN presently serving the AT. This approach provides better load balancing among RNC's, allowing user sessions to be distributed across RNC's more dynamically, while also taking into account the current position of the AT. In case of an RNC failure, all new session requests will arrive at the RNC Resource Control Agent who will then assign these sessions to new RNC's, again based on loading and other considerations.

The RNC Resource Control Agent may also be used to trigger dormant handoffs for load balancing or other purposes. In Phase 1 IS-856 networks, a dormant inter-RNC handoff is always triggered by the AT upon detection of a subnet change. As described above, lack of an immediate dormant handoff may result in lost paging data.

Figure 4:
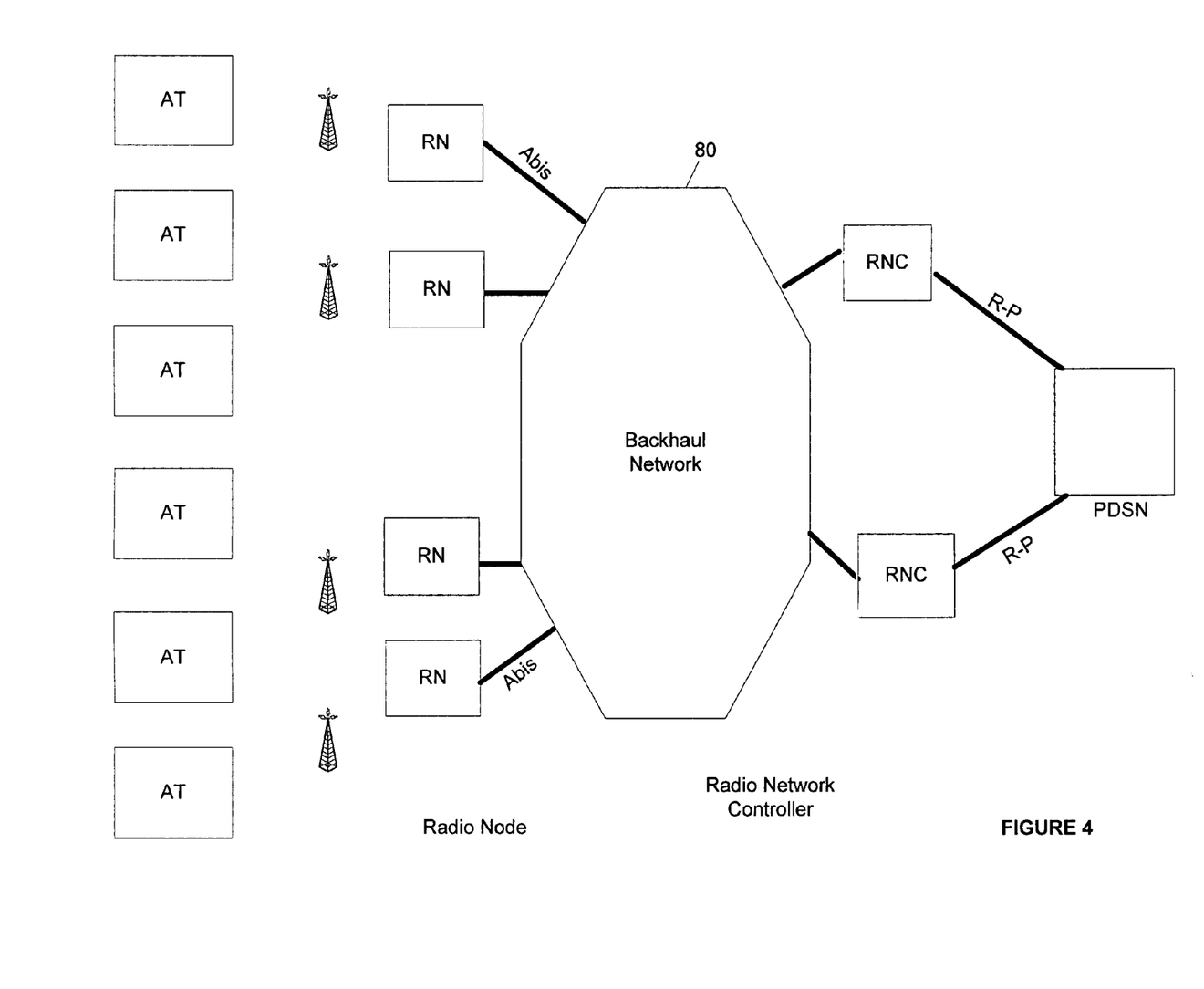

In the improved IS-856 networks shown in FIGS. 3 and 4, a dormant handoff can be initiated by the network based on the location of the AT. Upon receipt of a RouteUpdate, when a serving RNC determines that a transfer of a user session to another RNC is desired (for load balancing or other reasons), the serving RNC sends a Dormant Handoff request to the RNC Resource Control Agent who assigns the session to a new RNC. The new serving RNC then assigns a new UATI and performs a session transfer from the previous serving RNC.

In a more distributed implementation of the RNC Resource Control Agent concept, RNC's can constantly communicate with the RN's and other RNC's to provide routing information (including their loading) to all the RN's, thereby allowing the RN's to route incoming session requests to the correct RNC without going through a RNC Resource Control Agent. For example, each RN may have a preferred RNC list and whenever it needs to assign a new session to an RNC, it selects one of the RNC's in this list according to some algorithm (pseudo-random selection, round-robin, etc.) If an RNC in the preferred list were to become unavailable, the RN would detect this (KeepAlive messaging can be used between RN's and RNC's to help the RN detect an RNC failure), and remove that RNC from its preferred list. A drawback of this approach is that some backhaul signaling traffic would be created as a result of exchanging such dynamic loading information.

Failure Recovery with Session Preservation

In some networks, it may be necessary to recover user session information in case of an RNC failure. This would eliminate the air link congestion that hundreds of new session requests could create shortly after an RNC failure. In order to preserve sessions in case of failure of an RNC, a copy of such information (for all sessions in the subnetwork) can be stored in the RNC Resource Control Agent.

When an RNC fails and the AT initiates a new session, its new session request will reach the RNC Resource Control Agent. The RNC Resource Control Agent then not only assigns a new serving RNC to each session, but also provides the session information thereby avoiding lengthy session establishment procedures. Once a new UATI is successfully assigned to the AT, communication with the network may resume. The RNC Resource Control Agent further provides information related to the A10 interface, in order to allow the RNC establish an A10 session with the same PDSN, thereby avoiding the setting up of new PPP and Mobile/Simple IP sessions.

In a chassis-based RNC, the RNC Resource Control Agent may run on a specific redundant card, with a hot standby. The RNC Resource Control Agent is then responsible for storing session information. In case a server module fails, the session is internally reallocated to another server module. In principle, the operation of this system is the same as the one operating across the network. Moreover, in this case, it is not necessary to reestablish the A10 session to the PDSN, since the external IP address of the PCF seen by the PDSN can be maintained.

Integrated RNC & PDSN

Another benefit of the IP-based radio access network architecture described above is the ability to combine the RNC and PDSN functions in a single network element. In hierarchical 3G packet data networks, a PDSN represents the highest point in the hierarchy, and therefore can support multiple RNC's. A new generation of PDSN's are expected to supports hundreds of thousands of users, and several RNC's.

In existing radio access networks with dedicated point-to-point links between RN's and RNC's, migrating the PDSN function to the RNC would be undesirable, because this would reduce the number of sessions that could be supported, resulting in frequent costly handoffs between PDSN's that involve new PPP and Simple/Mobile IP registrations.

In the IP-based radio access network architecture described here handoffs between RNC's occur much less frequently therefore allowing the integration of the PDSN function into the RNC. Since an active call can always be served by the same RNC, inter-PDSN handoffs are normally not required during an active call. Such an approach also simplifies the networking between the RNC and the PDSN, and further increases scalability and reliability.

In an RNC with an integrated PDSN, the PDSN functionality includes PPP termination, Simple IP and/or Mobile IP foreign agent and the AAA client functions. As long as the AT remains within a subnet (say an RNC cluster), no inter-PDSN handoffs would be required.

If an integrated RNC/PDSN fails, all sessions supporting an AT (including the air interface, PPP and Simple/MobileIP sessions) are transferred to another RNC/PDSN thereby avoiding any new session establishment between the AT and the wireless network.

It is also possible to integrate the RNC/PDSN with the RN. In this case, the RNC/PDSN functionality may be co-located with the RN in the same site, or even in the same enclosure.

IP-based Radio Access Network Architecture with Primary/Secondary RNC Association Each RN has a primary (e.g., default) RNC with which the RN associates (e.g., establishes a primary association), as described above. Using the backhaul network 80, each RN may also associate with one or more other RNC's in the IP RAN, and these RNC's are referred to as secondary RNC's for that RN (e.g., establishes a secondary association). To associate with an RNC, the RN provides sufficient information about itself to the secondary RNC's to allow these RNC's to communicate with AT's via that RN. Further, to support signaling exchanges between the RN and secondary RNC's, signaling connections are established between them. The RNC also distinguishes between primary RN's and secondary RN's. Primary RN's are those that have a primary association with that RNC. The establishing of secondary associations can be performed, for example, when an RN powers up.

When an RN receives an access channel packet from an AT, the RN forwards the packet blindly to its primary RNC. A dormant AT in the coverage area of an RN is served by the primary RNC of that RN. In a basic implementation, all RN's that share the same primary RNC belong to the same 1xEV-DO subnet. When the AT crosses a subnet boundary, the AT sends a UATI-Request to its serving RN, who then forwards the request to its primary RNC. Since this UATI is not served by that RNC, that RNC initiates the normal procedures for dormant inter-RNC handoff with the old serving RNC according to the A13 interface defined in 1xEV-DO IOS. The new RNC also performs an A10 handoff. In summary, this method does preserve the dormant handoff boundaries between RNC's.

It is also possible to allow RN's that belong to different 1xEV-DO subnets to share the same primary RNC. In this case, when the AT sends a UATI-Request upon crossing a subnet boundary, the message gets forwarded to the same primary RNC that is currently serving the AT (because the same RNC is the primary RNC for RN's in both subnets). The primary RNC, recognizing that it is already serving this UATI, can then proceed with a UATI assignment without an A13 procedure or an A10 handoff.

When the primary RNC receives an incoming data over an A10 connection for a dormant AT, the primary RNC proceeds with the paging procedure as usual. The paging message is again sent via all RN's that have this RNC as the primary RNC, or a subset thereof.

When a serving RNC receives a traffic channel request message from an AT requesting the set up of a traffic channel, the serving RNC first examines the Route Update message to determine the pilots that are needed and finds the RN's where these pilots are located. The serving RNC then contacts these RNs to set up the traffic channel as usual. The primary/secondary association allows the RNC to map the PN offsets of the requested pilots to RN's IP addresses and use the pre-established signaling connection with these RN's to set up all handoff legs. Once an active traffic channel is established, the serving RNC remains anchored as the RNC for that traffic channel. The serving RNC adds and removes RNs as the AT moves through coverage areas using the secondary associations of the RNs.

For example, as an AT first communicates with a first RN, that RN, as described above, forwards a request to its primary RNC (i.e., the RNC with which the first RN has a primary association). Once a traffic channel is established, the primary RNC remains the serving RNC for that entire traffic channel as the AT travels from the coverage area of the first RN to the coverage area of a second RN, even though that second RN does not have a primary association with the serving RNC. This allows the user activity (e.g., phone call, data transfer) to continue uninterrupted. While the AT is moving from the coverage area of the first RN to the coverage area of the second RN, the AT communicates the pilot strength information for the second RN to the serving RNC by sending a RouteUpdate message. As in normal soft handoff between RN's that have the same primary RNC, this communication occurs while the AT is still using the first RN. Upon reception of the RouteUpdate message, the serving RNC can communicate with the second RN because of the established secondary association, which, as described above, includes information such as the PN offset of the pilot signal and the IP address of the RN, to allow the serving RNC to contact the second RN and establish a communication channel. One appealing aspect of the handoff procedure above is that it works just like normal soft handoff. The only difference is the secondary association between RN's and RNC's, which allow the RNC to set up a traffic channel with RN's with whom it does not have a primary association.

Since RN's always forward their access channel packets to their primary RNC, there is no longer a need for the RN to perform access channel packet routing based on UATI. This greatly simplifies the implementation of the IP-based radio access network.

Chassis-Based Systems

The concepts described above can also be used in chassis-based systems by, for example, treating each server card as an IP addressable RNC or each modem card as an IP addressable RN. The logical operation of the system is unchanged.

However, in large networks with many server cards, treating each server card as an independent RNC may result in too many RNC's, which in turn can create many signaling connections and RN-to-RNC associations. One way to hide this complexity is to treat the entire chassis as an IP addressable RNC and handle intra-chassis communication using internal protocols. Again the concepts described above can be used in the same fashion, and the logical operation of the RNC and RN are unchanged when viewed from the outside. The following description describes in more detail how these concepts impact the internal operation of a chassis-based RNC.

In some of the examples above, when an RN associates with its primary or default RNC, a signaling connection is established between the RN and RNC. In a chassis-based system, one of the server cards may assume the responsibility for performing the association and terminating the signaling connection. This means, when a new RN wants to associate with an RNC, the RN is internally assigned (homed on) to one of the server cards. Subsequently, all signaling between the RNC and the RN is performed via that server card. In the IP-based radio access network architecture with inter-RNC signaling, a chassis-based RNC can discover other RNC's, including the PN offsets these RN's serve and the UATI space they control, using an inter-RNC topology manager, which may reside in a system controller (SC) card. System controller card communicates with the server cards to learn the necessary information about the RN's to pass onto other RNC's.

When an RN forwards a received AC packet to a chassis-based RNC, the packet is first intercepted by an I/O card, which inspects the UATI address in the AC packet, determines the server card serving that UATI and forwards the packet to that server card. When the UATI is served locally, the I/O card determines the specific server card, which is serving the UATI and forwards the packet to that server card. To perform such forwarding, the I/O card maintains tables that map UATI addresses to RNC's and further maps local UATI addresses to server cards.

When a server card in a chassis-based RNC receives a request for a traffic channel set up from an AT, the server card first determines from the RouteUpdate message the set of RN's whose pilots are needed for the active set by mapping the received PN offsets to RN IP addresses. The server card then exchanges signaling directly with those RN's that are homed on that server card to establish the needed traffic channel legs. For other RN's that are homed on the same RNC chassis, if there are any, the server card first determines the server cards where those RN's are homed. The server card contacts these server cards sharing the same chassis, which in turn contact the RN's to establish a traffic channel leg. For other RN's that are homed on other RNC chassis, the server card contacts these RNC's. The I/O card in these RNC's then route the request to the server cards where the RN's are homed on. These server cards then contact the RN's to establish the needed traffic channel legs.

Since direct IP communication is possible between all RN's and RNC's in the IP RAN, all traffic channel legs operate directly between the RN's and the serving RNC. When the I/O card of a chassis-based RNC receives a traffic channel packet, the I/O card forwards the packet to the server card where the traffic channel is being handled based on a unique connection identifier.

The chassis-based RNC can maintain communication with an AT, even when the AT is in the coverage area of an RN for which it is not the primary RNC. All user traffic flows directly between the RN's and the serving RNC. When a dormant AT travels across the entire IP RAN, an inter-RNC handoff is not required (although possible), since the serving RNC can page an AT via any RN in the IP RAN.

In the IP-based radio access network architecture with inter-RNC signaling, there is discovery and communication between the RNC's via the System Controller cards, as described above. This architecture can also result in triangular routing of access channel packets when the primary RNC is not the serving RNC, and packets are routed via the I/O card of another chassis-based RNC. Also, the failure of an RNC server card results in the failure of all RN's who are homed on it. If the entire RNC chassis fails, all primary RN's are lost.

In the improved IP-based radio access network architecture without inter-RNC signaling, the RN associates with multiple RNC's in the IP RAN and maintains a table to map a UATI address to the serving RNC. In this approach, RN's may be configured with the subnet information, while in the other methods with a primary RNC this information may be supplied by the primary RNC. The RN also maintains a signaling connection with multiple RNC's in the IP RAN. All signaling now terminates in one of the server cards on the chassis-based RNC, which is assigned to home that RN. The RN provides information about itself, including its IP address to the server card where it is homed. This server card in turn distributes the information to all other server cards in the chassis-based RNC.

In these examples, when the RN receives an access channel packet from an AT, the RN inspects the UATI address field, determines the IP address of the serving RNC from its table, and then forwards the packet to that RNC. The I/O card in the chassis-based RNC intercepts the packet, identifies the packet as an access channel packet, inspects the UATI address, and routes the packet to the server card handling this AT. In traffic channel set up, the server card directly contacts those RN's, which are homed on the server card to request the set up of a traffic channel leg. For other RN's, the server card first determines the other server card where the RN is homed, and contacts that other server card who in turn contacts the RN to set up the traffic channel leg. In this approach, RNC's can behave as autonomous entities with no inter-RNC communication, except to handle possible inter-RNC handoffs to optimize routing. However, there is inter-card communication to handle homing.

Even though triangular routing between RNC chassis have been eliminated there can be indirect routing inside the chassis, if all packets travel via the I/O card, which performs a higher-layer routing function. The failure of a server card results in the failure of the RN's that are homed on it. These RN's can no longer serve any of the sessions that reside on the RNC, even those that are still alive on server cards other than the failed server card. Such problems do not occur when each server card in the chassis behaves as an IP addressable RNC. In this case, packets are routed directly between RN and RNC server cards and failure of a server card does not impact RN's or other server cards.

In IP-based radio access network architecture with primary/secondary association, a set of chassis-based RNC's are connected to a set of RN's via an IP backhaul network and there are primary or secondary associations between all of the RNs and all of the RNCs.

Each RN has a primary chassis-based RNC with which the RN associates as described above. Each RN also associates with other chassis-based RNC's in the IP RAN, and these are referred to as secondary RNC's for that RN. The RN provides sufficient information about itself to the secondary RNC's to allow these RNC's to communicate with AT's via that RN. Further, to support signaling exchanges between the RN and secondary RNC's, signaling connections are established between the RN and its secondary RNC's. In each case, the association between the RN and the chassis-based RNC is handled via one of the server cards in the RNC chassis.

Access channel packets that are blindly forwarded by the RN to its primary RNC are intercepted by the I/O card, which inspects the UATI field and forwards the packet to the server card currently handling that UATI. A dormant AT in the coverage area of an RN is served by a server card in the primary RNC of that RN. All RN's that share the same primary RNC belong to the same 1xEV-DO subnet. When the AT crosses a subnet boundary, the AT sends a UATI-Request to its serving RN, who then forwards the request to its primary RNC. Since this UATI is not served by that RNC, the I/O card after inspecting the UATI field, forwards the request to any one of its server cards. A server card can then initiate the normal procedures for dormant inter-RNC handoff with the old serving RNC according to the A13 interface defined in 1xEV-DO IOS. The new server card also performs an A10 handoff.

It is also possible to allow RN's that belong to different 1xEV-DO subnets to share the same primary RNC. In this case, when the AT sends a UATI-Request upon crossing a subnet boundary, the message gets forwarded to the same primary RNC that is currently serving the AT (because the same RNC is the primary RNC for RN's in different subnets). By inspecting the UATI address, the I/O card in the primary RNC can forward the packet to the server card that is currently serving that UATI, and that server card can then proceed with a UATI assignment without an A13 procedure or an A10 handoff.

When the primary RNC receives incoming data over an A10 connection for a dormant AT, the packet is again intercepted by the I/O card, which, after inspection forwards the packet to the server card handling that A10 link. The server card then proceeds with the paging procedure as usual. The paging message is again sent via all RN's that have this RNC as the primary RNC, or a subset thereof.

When a server card receives a traffic channel request message from an AT requesting the set up of a traffic channel, the server card examines the Route Update message to determine the pilots that are needed and finds the other server cards that are currently handling these pilots. The server card contacts these other server cards, which in turn contact the RNs to set up the traffic channel as usual. The primary/secondary association allows the server card to map the PN offsets of the requested pilots to identifiers for the server cards where the RN's are homed and use the pre-established signaling connection through these homed RN's to set up all handoff legs.

The description above can be further extended to increase reliability in case of a server card failure. In some examples, when a server card fails, all user sessions served by that card are also lost. This means the user may remain unreachable for a considerable amount of time. The user may also be unaware that he/she is unreachable. To prevent this, when a user session is first established a copy of the session state information is stored on a separate card, for example, the system controller card. Session information includes various protocol configurations, mobility information, UATI, etc. When the session parameters change, the session information on the system controller card is updated.

The system controller card uses a heartbeat signaling mechanism to detect the failure of a server card and assigns the session to any one of the remaining server cards. The new server card may reassign the UATI to ensure that the new server card has connectivity with the AT. In this method, using just one extra server card in a load-balanced N+1 redundancy configuration will ensure that there is enough headroom to reassign the sessions on the failed server card.

Even though some of the techniques described above employ the 1xEV-DO air interface standard, the techniques are equally applicable to other CDMA and non-CDMA air interface technologies. In this case, the link layer address (ATI) could be something different from ATI used in 1xEV-DO (e.g., TMSI in cdma2000), and other RN zones, such as paging zones, PCF zones, etc, could be used instead of 1xEV-DO subnets. Other embodiments are within the scope of the following claims.

The invention claimed is:

1. A method comprising,
   in connection with a wireless network that includes a first radio network controller, a second radio network controller, a first radio node, and a second radio node,
   establishing a first session for a first access terminal on the first radio network controller via the first radio node,
   establishing a second session for a second access terminal on the second radio network controller via the second radio node,
   communicating first packets over a first traffic channel between the first access terminal and the first radio network controller using the first radio node and without the first packets passing through the second radio network controller,
   maintaining the first traffic channel as the first access terminal moves from a coverage area of the first radio node to a coverage area of the second radio node,
   communicating second packets over the first traffic channel between the first access terminal and the first radio network controller using the second radio node and without the second packets passing through the second radio network controller while the first access terminal remains in an active state in any portion of the coverage area of the second radio node, and
   establishing a new session for the first access terminal on the second radio network controller or performing an inter-RNC dormant handoff from the first radio network controller to the second radio network controller when the first access terminal is in a dormant state in the coverage area of the second radio node.

2. The method of claim 1 further comprising,
establishing a primary association between the second radio node and the second radio network controller and establishing a secondary association between the second radio node and the first radio network controller.

3. The method of claim 2,
wherein establishing the primary association comprises passing PN offset and IP address information from the second radio node to the second radio network controller, and
wherein establishing the secondary association comprises passing PN offset and IP address information from the second radio node to the first radio network controller.

4. The method of claim 2 further comprising,
employing an RNC resource control agent for storing the session information for sessions being served by one or more radio network controllers.

5. The method of claims 1 or 2 further comprising,
employing a chassis-based hardware platform with multiple server cards to implement each of the radio network controllers.

6. The method of claim 5 further comprising,
establishing an association between the second radio node and the first radio network controller by homing on one of the server cards on the first radio network controller, and
establishing an association between the second radio node and the second radio network controller by homing on one of the server cards on the second radio network controller.

7. The method of claim 6 wherein,
establishing the association comprises passing PN offset information from the second radio node to the server card to which it is homed,
the method further comprising distributing the PN offset information from the server cards receiving the PN offset information to other server cards in the chassis-based hardware platform.

8. The method of claim 6 further comprising,
establishing a transport-layer connection for signaling between each radio node and the server cards to which it is homed in the radio network controllers.

9. The method of claim 8 wherein,
establishing the association comprises passing PN offset information from the second radio node to the server card to which it is homed,
the method further comprising distributing the PN offset information from the server cards receiving the PN offset information to other server cards in the chassis-based hardware platform.

10. The method of claim 1 wherein,
the inter-RNC handoff procedure complies with an A13 interface of a 1xEV-DO IOS specification.

11. The wireless network of claim 10 wherein a new session is established for the first access terminal on the second radio network controller or an inter-RNC dormant handoff from the first radio network controller to the second radio network controller is performed when the first access terminal is in dormant state after moving from a coverage area of the first radio node to a coverage area of the second radio node.

12. The method of claim 1 wherein,
the radio network controllers comprise a PDSN function.

13. The method of claim 1 wherein,
the first radio network controller and the first radio node are co-located, and
the second radio network controller and the second radio node are co-located.

14. The method of claim 1 or 2 further comprising,
broadcasting, by the first radio node, a first subnet identifier,
broadcasting, by the second radio node, a second subnet identifier different from the first subnet identifier,
monitoring, by the first access terminal, the subnet identifier while in the dormant state, and
triggering the new session establishment or the inter-RNC dormant handoff from the first radio network controller to the second radio network controller upon detecting a change in the subnet identifier.

15. The method of claim 14 further comprising,
individually configuring each radio node with its respective subnet identifier.

16. The method of claim 14 further comprising,
obtaining, by the second or a third radio node its subnet identifier from the respective radio network controller with whom it has established a primary association.

17. The method of claim 14 wherein,
triggering comprises triggering, by the first access terminal, the new session establishment or the inter-RNC dormant handoff from the first radio network controller to the second radio network controller, by sending a UATI Request message.

18. The method of claim 17 further comprising,
individually configuring each radio node with its respective subnet identifier.

19. The method of claim 17 further comprising,
obtaining, by the second or a third radio node its subnet identifier from the respective radio network controller with whom it has established a primary association.

20. The method of claim 17 further comprising,
detecting, by the RNC resource control agent, a failure of a radio network controller, and
upon detection of the failure of a radio network controller, reassigning user sessions to remaining radio network controllers and passing session information to these remaining radio network controllers.

21. The method of claim 14 further comprising,
establishing a primary association between a third radio node and the first radio network controller,
establishing a secondary association between the third radio node and the second radio network controller,
broadcasting, by the third radio node, a third subnet identifier different from first and second subnet identifiers associated with the first and second radio nodes,
the first radio network controller assigning a new UATI to the first access terminal when it is in dormant state after moving from a coverage area of the first radio node to a coverage area of the third radio node, and
triggering the new UATI assignment, by sending a UATI Request message, upon detecting a change in the subnet identifier.

22. The method of claim 21 further comprising,
individually configuring each radio node with its respective subnet identifier.

23. The method of claim 21 further comprising,
obtaining, by the second or a third radio node its subnet identifier from the respective radio network controller with whom it has established a primary association.

24. A computer program product, on a computer readable medium tangibly embodied in an information carrier, and to work in a wireless network including a first and a second radio network controller and a first and a second radio node, the computer program product comprising instructions operable to cause data processing apparatus to:
establish a first session for a first access terminal on the first radio network controller via the first radio node,
establish a second session for a second access terminal on the second radio network controller via the second radio node,
establish a first traffic channel between the first access terminal and the first radio network controller,
communicate first packets over the first traffic channel between the first radio node and the first radio network controller without the first packets passing through the second radio network controller,
maintain the first traffic channel as the first access terminal moves from a coverage area of the first radio node to a coverage area of the second radio node, and
while the first access terminal remains in an active state in any portion of the coverage area of the second radio node, communicate second packets over the first traffic channel between the first access terminal the first radio network controller using the second radio node and without the second packets passing through another radio network controller.

25. The computer program product of claim 24, wherein the instructions are further operable to cause the data processing apparatus to,
establish a new session for the first access terminal on the second radio network controller or performing an inter-RNC dormant handoff from the first radio network controller to the second radio network controller when the first access terminal is in dormant state after moving from a coverage area of the first radio node to a coverage area of the second radio node.

26. A wireless network comprising,
a first radio network controller,
a second radio network controller,
a first radio node,
a second radio node,
a first access terminal that is associated with a first session established on the first radio network controller via the first radio node and a first traffic channel established with the first radio network controller, the first access terminal communicating first packets over the first traffic channel, between the first radio node and the first radio network controller without the first packets passing through the second radio network controller, and
a second access terminal that is associated with a second session established on the second radio network controller via the second radio node,
wherein the first traffic channel is maintained as the first access terminal moves from a coverage area of the first radio node to a coverage area of the second radio node, and
wherein second packets are communicated between the first access terminal and the first radio network controller using the second radio node and without the second packets passing through the second radio network controller while the first access terminal remains in an active state in any portion of the coverage area of the second radio node.

* * * * *